(12) United States Patent
El Hattami et al.

(10) Patent No.: US 12,254,014 B1
(45) Date of Patent: Mar. 18, 2025

(54) DOCUMENT CREATION WITH GUIDED GENERATIVE ARTIFICIAL INTELLIGENCE

(71) Applicant: ServiceNow, Inc., Santa Clara, CA (US)

(72) Inventors: Amine El Hattami, Zurich (CH); Thomas Belkowski, Zurich (CH)

(73) Assignee: ServiceNow, INc., Santa Clara, CA (US)

( * ) Notice: Subject to any disclaimer, the term of this patent is extended or adjusted under 35 U.S.C. 154(b) by 0 days.

(21) Appl. No.: 18/585,535

(22) Filed: Feb. 23, 2024

(51) Int. Cl.
  *G06F 16/20* (2019.01)
  *G06F 16/2453* (2019.01)
  *G06F 16/2457* (2019.01)

(52) U.S. Cl.
  CPC .. *G06F 16/24575* (2019.01); *G06F 16/24535* (2019.01)

(58) Field of Classification Search
  None
  See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

U.S. Appl. No. 17/903,361, filed Sep. 6, 2022.

*Primary Examiner* — Jau Shya Meng
(74) *Attorney, Agent, or Firm* — McDonnell Boehnen Hulbert & Berghoff LLP

(57) ABSTRACT

A method includes obtaining a topic of a document and an information source associated with the document. The method also includes generating, using a generative machine learning (ML) model, the document based on the topic and the information source. The method additionally includes identifying a query that is associated with the topic and determining, using a validation model, that the query is not addressed by the document. The method yet additionally includes, based on determining that the query is not addressed by the document, generating an updated document using the generative ML model based on the topic, the information source, and the query. The method further includes determining, using the validation model, that the query is addressed by the updated document, and outputting the updated document.

20 Claims, 9 Drawing Sheets

(56) References Cited

U.S. PATENT DOCUMENTS

| | | |
|---|---|---|
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Joe |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,328,260 B1 | 2/2008 | Muthiyan |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 9,069,737 B1 | 6/2015 | Kimotho |
| 9,860,337 B1 * | 1/2018 | Brown ............... G06F 16/3331 |
| 9,971,826 B1 | 5/2018 | Belmar |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,878,186 B1 * | 12/2020 | Liu ....................... G06F 18/29 |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B2 | 3/2022 | Tal |
| 11,281,442 B1 | 3/2022 | Tal |
| 11,294,666 B1 | 4/2022 | Look |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,582,106 B2 | 2/2023 | Hameiri |
| 11,616,690 B2 | 3/2023 | Feiguine |
| 11,630,717 B2 | 4/2023 | Vutukuru |
| 11,632,303 B2 | 4/2023 | Bitterfeld |
| 11,640,369 B2 | 5/2023 | Bhogle |
| 11,671,444 B2 | 6/2023 | Waplington |
| 11,695,641 B2 | 7/2023 | Bar Oz |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0288053 A1 | 12/2006 | Holt |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0198654 A1 * | 8/2009 | Surendran ............... G06Q 10/10 |
| 2009/0228984 A1 | 9/2009 | Sterin |
| 2010/0110932 A1 | 5/2010 | Doran |
| 2013/0283273 A1 | 10/2013 | Miyazaki |
| 2014/0122427 A1 | 5/2014 | Dary |
| 2018/0123940 A1 | 5/2018 | Rimar |
| 2019/0073257 A1 | 3/2019 | Dasgupta |
| 2019/0104398 A1 | 4/2019 | Owen |
| 2019/0129739 A1 | 5/2019 | Al Reza |
| 2019/0149515 A1 | 5/2019 | Sharma |
| 2019/0165957 A1 | 5/2019 | Abbott |
| 2019/0342162 A1 | 11/2019 | Bendre |
| 2020/0034462 A1 | 1/2020 | Narayanasamy |
| 2020/0050689 A1 | 2/2020 | Tal |
| 2020/0204443 A1 | 6/2020 | Bar Oz |
| 2020/0301678 A1 | 9/2020 | Burman |
| 2021/0097168 A1 | 4/2021 | Patel |
| 2021/0194764 A1 | 6/2021 | Badyan |
| 2022/0303352 A1 | 9/2022 | Herzog |
| 2023/0031152 A1 | 2/2023 | Bhaskaran |
| 2023/0229542 A1 | 7/2023 | Lawrence |
| 2023/0394038 A1 | 12/2023 | Shahrokh Esfahani |

(56) References Cited

U.S. PATENT DOCUMENTS

FOREIGN PATENT DOCUMENTS

| | | | |
|---|---|---|---|
| WO | 9934285 | W | 7/1999 |
| WO | 0052559 | W | 9/2000 |
| WO | 0179970 | W | 10/2001 |

* cited by examiner

800  GENERATE A DOCUMENT THAT COVERS ALL THE TOPICS USING THE FOLLOWING PROMPT AND INFORMATION SOURCES.
801  FURTHER, MAKE SURE TO INCLUDE INFORMATION THAT CAN ANSWER THE LIST OF QUERIES.
802
803  INFORMATION SOURCES:
804      INFORMATION SOURCE 832
805      ...
806      INFORMATION SOURCE 834
807
808  PROMPT:
809  I WANT TO CREATE A KNOWLEDGE BASE ARTICLE ABOUT [SUBJECT 836].
810
811  TOPICS:
812      TOPIC 838
813      ...
814      TOPIC 840
815
816  QUERIES:
817      QUERY 842
818      ...
819      QUERY 844
820

GENERATIVE ML MODEL INPUT 830

FIG. 8

DOCUMENT CREATION WITH GUIDED GENERATIVE ARTIFICIAL INTELLIGENCE

BACKGROUND

Generative machine learning (ML) is a branch of artificial intelligence aimed at generating new outputs (e.g., text, images, video, etc.) based on, for example, inputs that specify aspects of the new outputs. Typically, an ML model is trained using a large set of data to generate these outputs. In one example, a generative ML model may be configured to generate a text document associated with a subject, which the generative ML mode may receive as part of an input prompt. In some cases, the document generated by the ML model may be incomplete in that it may be missing at least some information on the subject.

SUMMARY

Various implementations disclosed herein include a generative machine learning (ML) model that may be used to generate a document associated with a subject. For example, a user may prompt the generative ML model to generate the document by providing a textual prompt that describes the subject. The document may be, for example, a knowledge base article that provides responses to queries that are frequently asked in connection with the subject. Specifically, the textual prompt may be used to identify (e.g., in a database storing queries and/or responses) a plurality of queries related to the subject and/or a plurality of information sources containing answers to these queries. The plurality of queries may be summarized using one or more topics. The generative ML model may be configured to generate the document based on the textual prompt, the one or more topics, and/or the plurality of information sources.

A validation model may be used to determine whether each of the plurality of queries is addressed by the document. That is, the validation model may evaluate how well the document describes the subject by assessing the extent to which the documents address queries related to the subject. In some cases, the validation model may identify one or more queries that are not addressed by the document. In order to improve the document's coverage of the subject and based on the validation model identifying the one or more queries that are not addressed by the document, the generative ML model may be used to generate an updated document based on the textual prompt, the one or more topics, the plurality of information sources, and the one or more queries. That is, the query identified by the validation model may be provided as an explicit input to the generative ML model to prompt the generative ML model to address the query in the updated document.

A query might not be provided as an explicit input to the generative ML model until the validation model determines that the document does not address the query, thus indicating that indirectly representing the query using a corresponding topic may be insufficient to prompt the generative ML model to completely and/or accurately address the query. Accordingly, the generative ML model may initially be allowed to generate the document based on topics that summarize the plurality of queries associated with the subject, but without providing the plurality of queries as an input thereto, thus avoiding prompting the generative ML model with potentially redundant queries. The generative ML model may be explicitly prompted to address a given query when a prior version of the document does not address the given query.

The generative ML model may be used to generate updated versions of the document until, for example, the validation model determines that the updated document addresses each of the plurality of queries, and thus adequately, sufficiently, and/or completely describes the subject. Using the generative ML model in combination with the validation model may allow for generation and revision of documents. To that end, a revised prompt may be provided to the generative ML model to cause the generative ML model to include, in the updated versions of the documents, any information missing from prior versions of the documents. Thus, a large number of documents spanning various subjects may be quickly generated and revised.

Accordingly, a first example embodiment may involve obtaining a topic of a document and an information source associated with the document. The first example embodiment may also involve generating, using a generative ML model, the document based on the topic and the information source. The first example embodiment may additionally involve identifying a query that is associated with the topic, and determining, using a validation model, that the query is not addressed by the document. The first example embodiment may further involve, based on determining that the query is not addressed by the document, generating an updated document using the generative ML model based on the topic, the information source, and the query. The first example embodiment may yet further involve determining, using the validation model, that the query is addressed by the updated document, and outputting the updated document.

A second example embodiment may involve a non-transitory computer-readable medium, having stored thereon program instructions that, upon execution by a computing system, cause the computing system to perform operations in accordance with any of the previous example embodiments.

In a third example embodiment, a computing system may include at least one processor, as well as memory and program instructions. The program instructions may be stored in the memory, and upon execution by the at least one processor, cause the computing system to perform operations in accordance with any of the previous example embodiments.

In a fourth example embodiment, a system may include various means for carrying out each of the operations of any of the previous example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 illustrates input for a generative machine learning model, in accordance with example embodiments.

DETAILED DESCRIPTION

Figure 1:
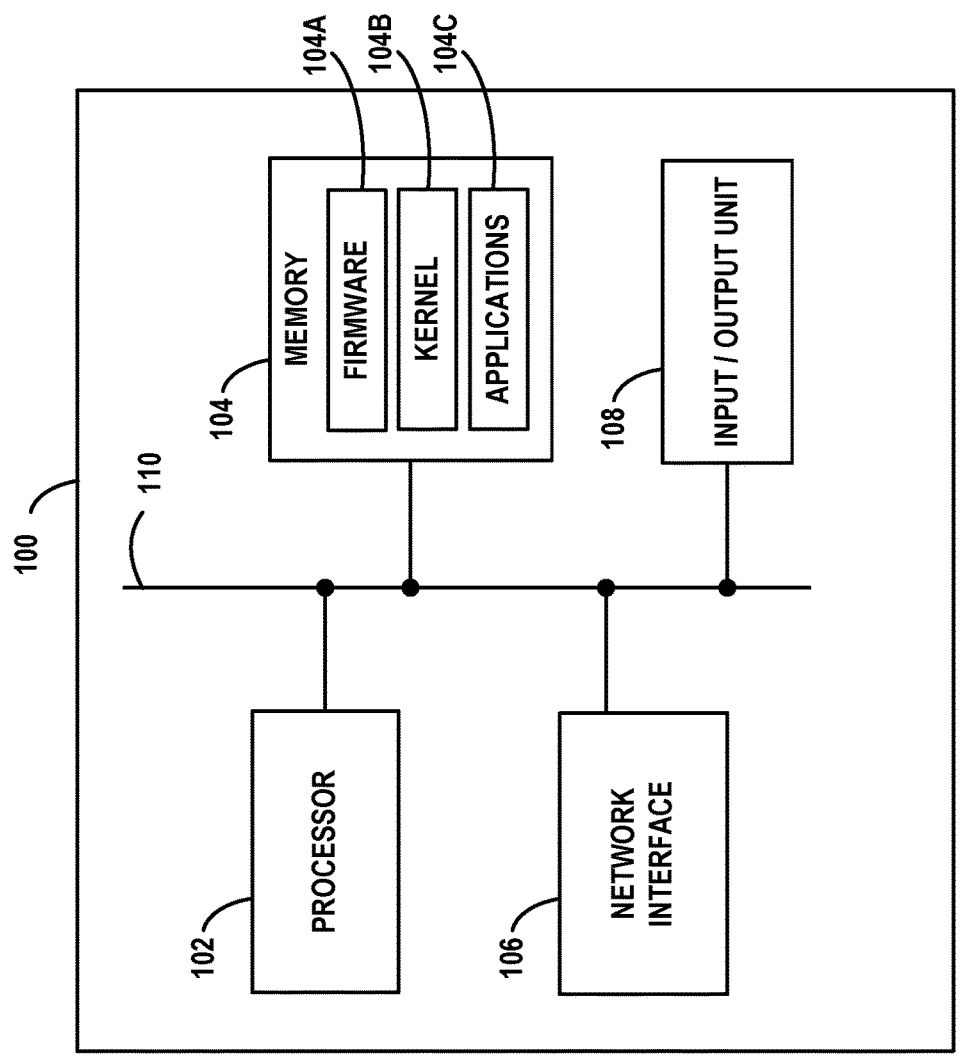
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM), IT service management (ITSM), IT operations management (ITOM), and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) has been introduced to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets and/or web components for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® bytecode) that a client device can use to directly generate graphical output therefrom. Other possibilities exist, including but not limited to metadata-based encodings of web components, and various uses of JAVASCRIPT® Object Notation (JSON) and/or eXtensible Markup Language (XML) to represent various aspects of a GUI.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), another form of co-processor (e.g., a mathematics or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, 10 Gigabit Ethernet, Ethernet over fiber, and so on). Network interface 106 may also support communication over one or more non-Ethernet media, such as coaxial cables or power lines, or over wide-area media, such as Synchronous Optical Networking (SONET), Data Over Cable Service Interface Specification (DOCSIS), or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
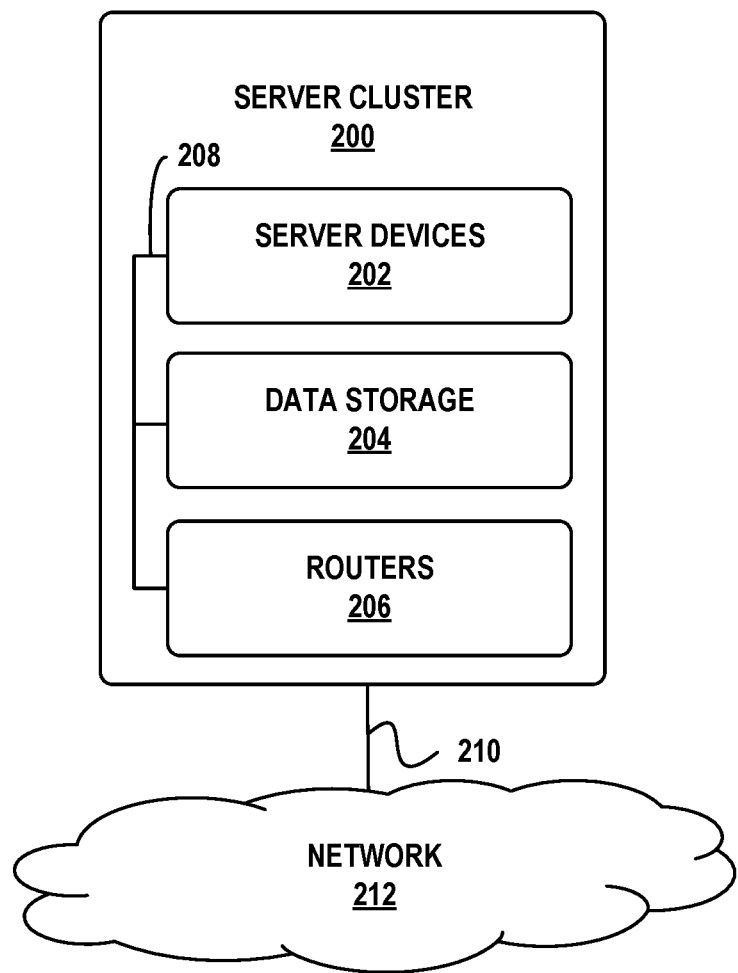
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database or a No-SQL database (e.g., MongoDB). Various types of data structures may store the information in such a database, including but not limited to files, tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, XML, JSON, or some other standardized or proprietary format. Moreover, server devices 202 may have the capability of executing various types of computerized scripting languages, such as but not limited to Perl, Python, PHP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
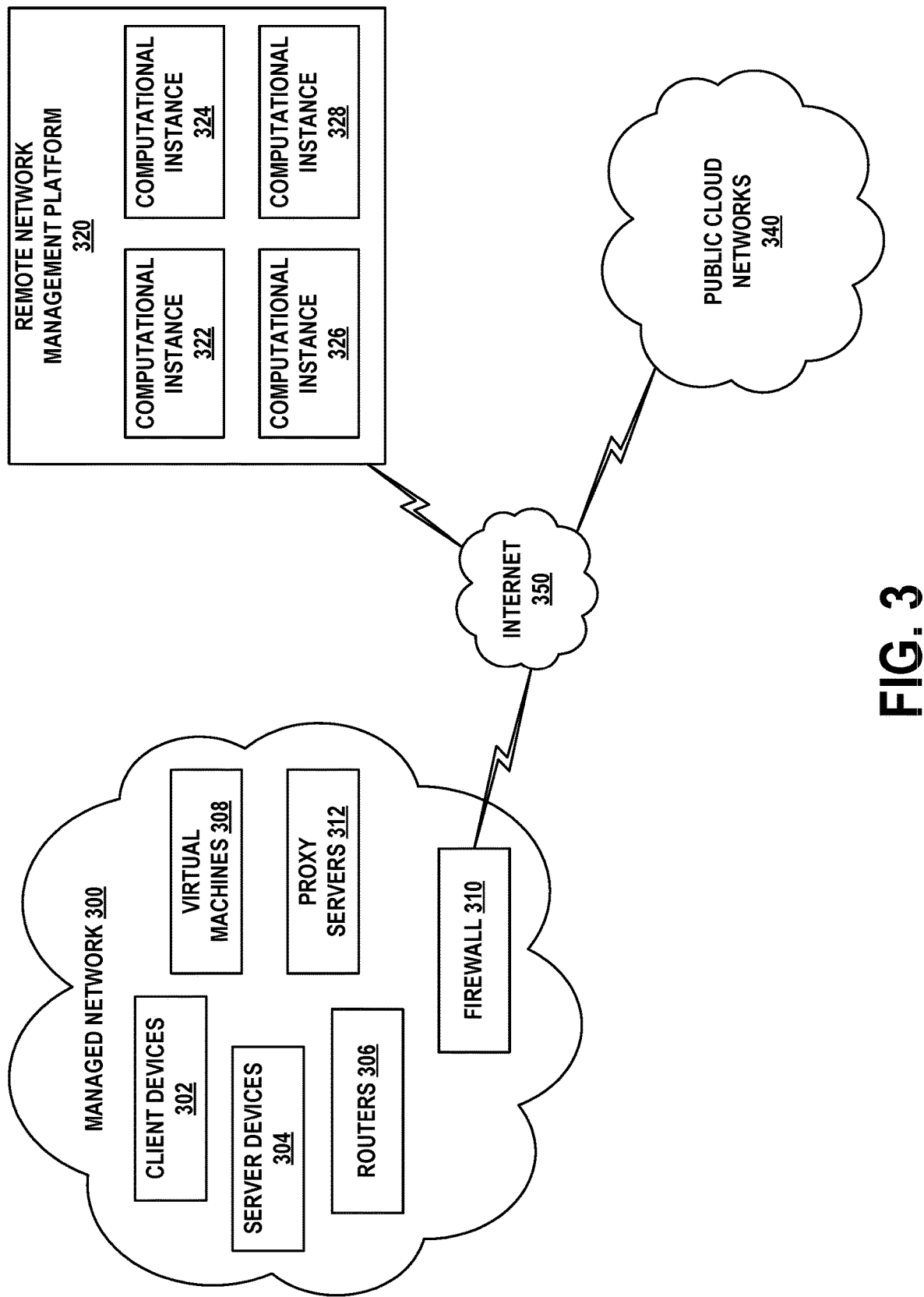
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
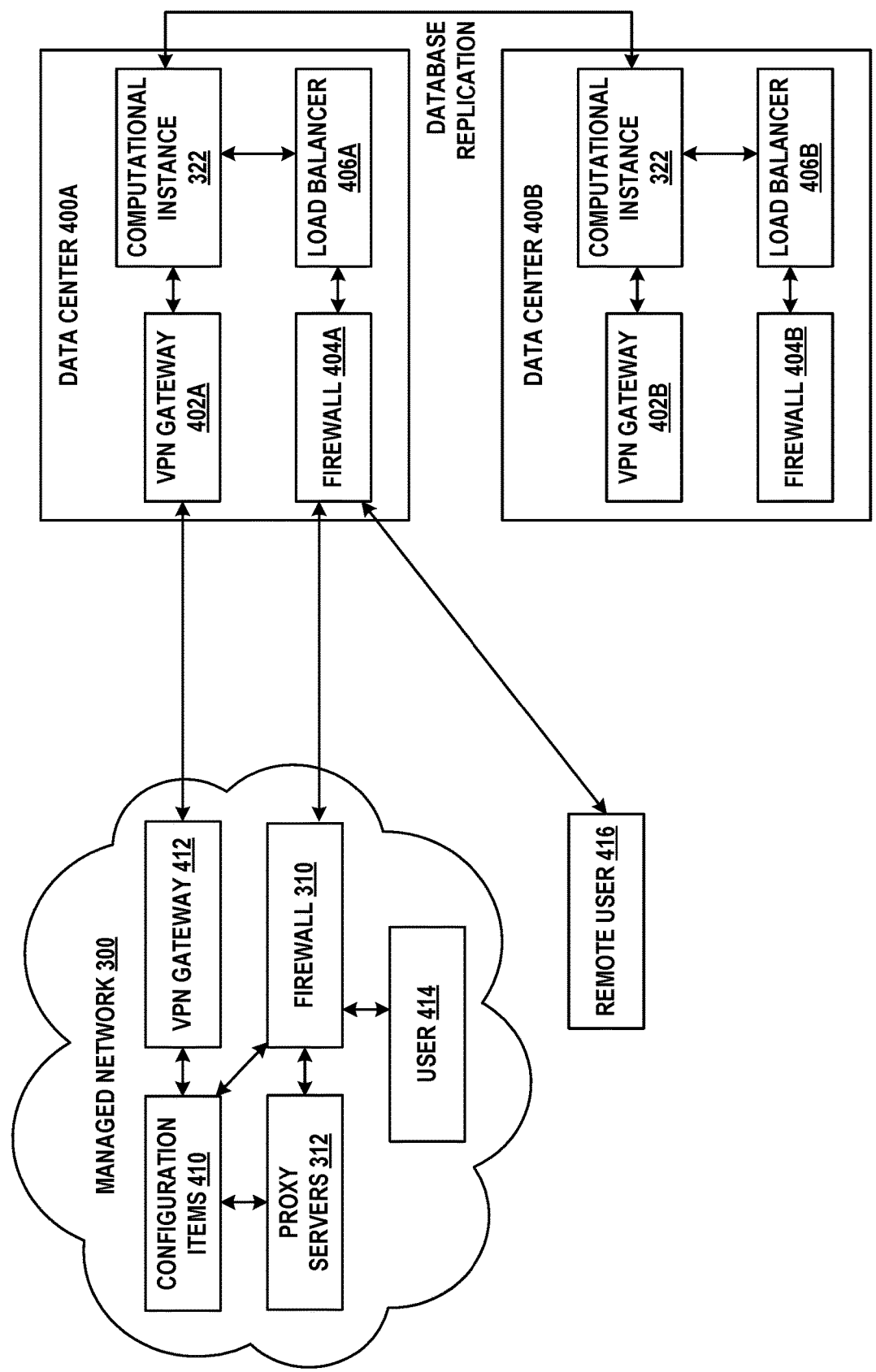
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of these devices, components, applications, and services may be referred to as configuration items.

The process of determining the configuration items and relationships therebetween within managed network 300 is referred to as discovery, and may be facilitated at least in part by proxy servers 312. To that point, proxy servers 312 may relay discovery requests and responses between managed network 300 and remote network management platform 320.

Configuration items and relationships may be stored in a CMDB and/or other locations. Further, configuration items may be of various classes that define their constituent attributes and that exhibit an inheritance structure not unlike object-oriented software modules. For instance, a configuration item class of "server" may inherit all attributes from a configuration item class of "hardware" and also include further server-specific attributes. Likewise, a configuration item class of "LINUX® server" may inherit all attributes from the configuration item class of "server" and also include further LINUX®-specific attributes. Additionally, configuration items may represent other components, such as services, data center infrastructure, software licenses, units of source code, configuration files, and documents.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
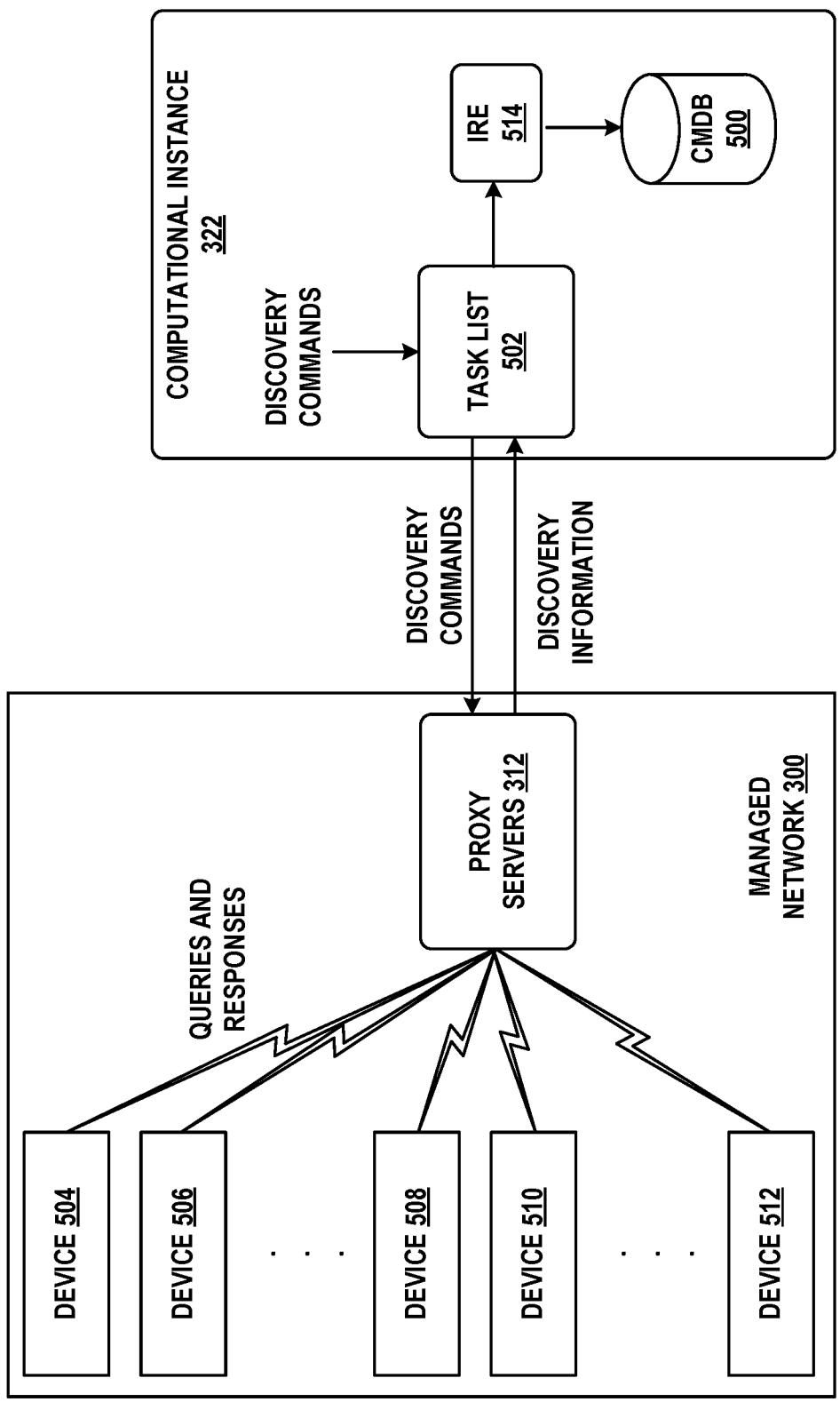
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of RE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, TRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Example Document Generation System

Figure 6:
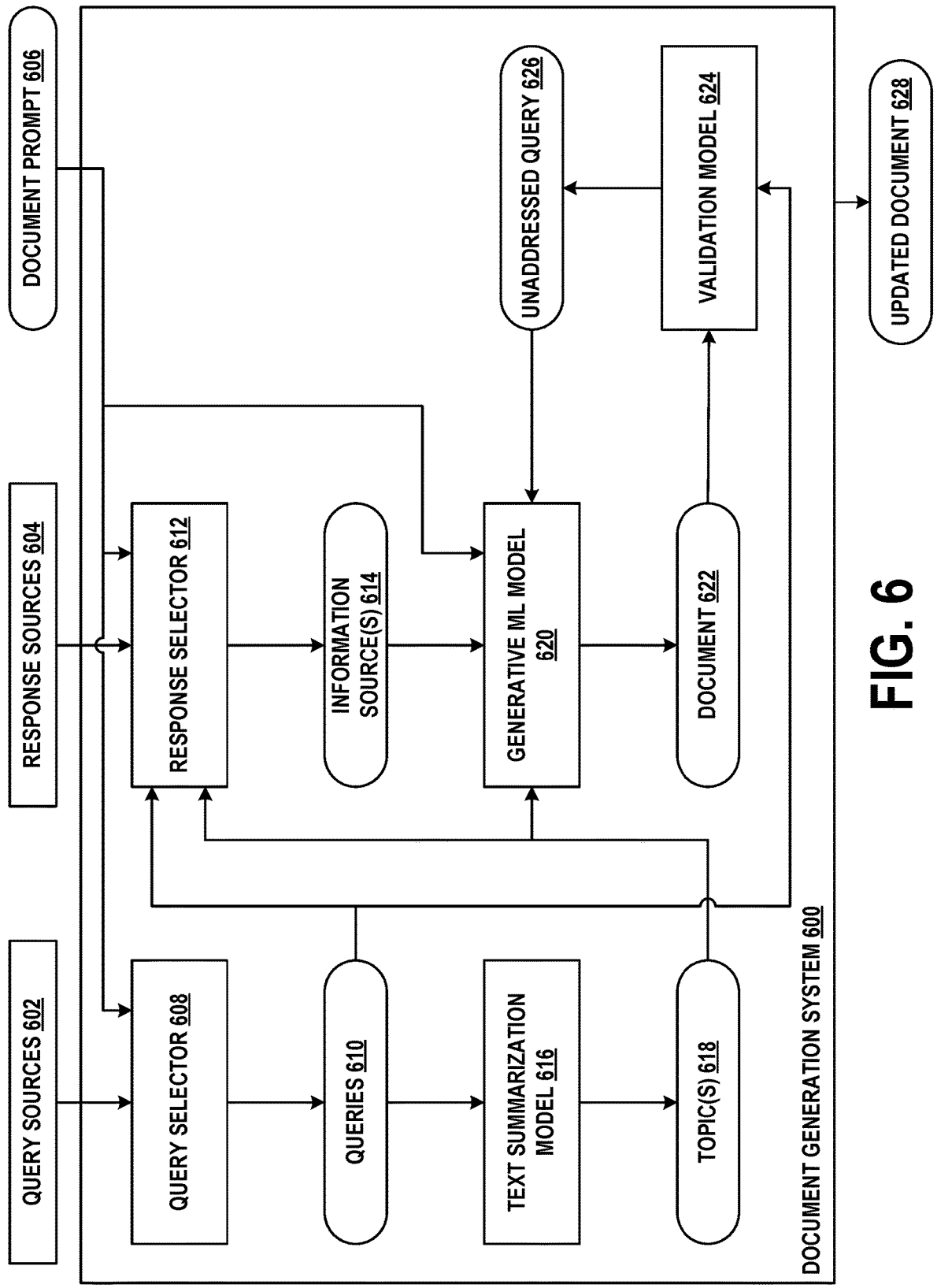
FIG. 6 illustrates a document generation system, in accordance with example embodiments.

FIG. 6 illustrates an example document generation system 600. Document generation system 600 may include query selector 608, response selector 612, text summarization model 616, generative ML model 620, and validation model 624. Document generation system 600 may be configured to generate updated document 628 based on query sources 602, response sources 604, and document prompt 606. Document generation system 600 may be implemented using hardware, software, or a combination thereof.

Document prompt 606 may include a request for generation of a document and may specify a subject for the document. Document prompt 606 may include and/or form part of an instruction to generate the document. The subject of the document may span one or more topics. That is, each of the one or more topics may be a subset of the subject that describes and/or relates to a corresponding aspects of the subject. When each of the one or more topics is described by the document, the document may be considered to sufficiently, adequately, and/or completely address the subject.

In some examples, document prompt 606 may include a textual description of the subject. In other examples, document prompt 606 may describe the subject using other data types, such as images and/or audio, among other possibilities. In some cases, document prompt 606 may be at least partly generated and/or provided to document generation system 600 by a user. In other cases, document prompt 606 may be at least partly generated and/or provided to document generation system 600 by another computing system.

Document prompt 606 may describe and/or indicate one or more attributes/properties of updated document 628. The one or more attributes/properties of updated document 628 may include, for example, a length, an extent of conciseness, an extent of technical complexity, a tone, and/or a style, among others. Document prompt 606 may also include one or more user-specified queries to be answered by updated document 628 and/or one or more user-specified topics to be covered by updated document 628. Thus, in addition to allowing the user to specify the subject for the document, document generation system 600 may also allow the user to provide specific queries that the user would like the document to answer and/or specific topics that the user would like the document to cover.

Document generation system 600 may operate to generate updated document 628 by identifying queries and responses that are related to document prompt 606, and generating text that addresses the identified queries using the identified responses. Thus, updated document 628 may describe the subject by, for example, addressing one or more queries related to the one or more topics spanned by the subject. For example, updated document 628 may be a knowledge base article that addresses one or more queries that are frequently asked in connection with the subject specified by document prompt 606. The knowledge base article may be directed to a technical subject and may thus facilitate usage and/or operation of one or more computing resources.

Query selector 608 may be configured to determine queries 610 based on document prompt 606 and query sources 602, and response selector 612 may be configured to determine information source(s) 614 likely to contain information responsive to queries 610. The queries in query sources 602 and the information in response sources 604 might be unstructured. For example, the queries and/or the information might not be explicitly mapped to any given subject or topic. As another example, a given query might not be mapped to a corresponding response/answer. Thus, although it may be possible to use query sources 602 and/or response sources 604 to find information on a given subject, it may be impractical and/or impossible to do so without using document generation system 600, especially as the size of and/or number of documents in sources 602 and 604 increases. Accordingly, query selector 608 and response selector 612 may filter sources 602 and 604, respectively, to identify information that is relevant to document prompt 606.

Queries 610 may include one or more queries that are relevant and/or related to document prompt 606. For example, query selector 608 may be configured to identify queries 610 in query sources 602 based on a similarity between document prompt 606 (e.g., the subject specified by document prompt 606) and each of queries 610. The similarity may be measured using a model and/or algorithm configured to quantify a semantic similarity between document prompt 606 and each of queries 610. The model and/or algorithm may include, for example, the best match 25 (BM25) algorithm, cosine similarity, Euclidean distance, Levenshtein distance, Jaccard index, and/or a neural network trained to quantify the semantic similarity, among other possibilities.

Query selector 608 may be configured to determine, for each respective query of a plurality of queries in query sources 602, a corresponding similarity value that represents a similarity between the respective query and document prompt 606 (e.g., the subject specified therein). Query selector 608 may select each of queries 610 based on each of queries 610 having a corresponding similarity value that exceeds a threshold query similarity value (e.g., 0.5, 0.6, 0.7, 0.75, etc.). Additionally or alternatively, query selector 608 may be configured to determine queries 610 by selecting up to a predetermined number of queries that are most similar to document prompt 606. Thus, queries 610 may include queries that, if addressed, are likely to assist with responding to document prompt 606, and may exclude queries that are likely to be irrelevant to document prompt 606.

Query sources 602 may include any data sources that are likely to include one or more queries and/or questions associated with document prompt 606. The data sources may include email(s), recording(s) and/or transcript(s) of meeting(s), documentation of product(s), documentation of process(es), contents of performed task(s), forum(s), blog post(s), chat group(s), and/or phone call(s), among other possibilities. The data sources may include textual data and/or non-textual data (e.g., audio, video, etc.) that may be used to generate textual data.

In some cases, document prompt 606 may be provided in connection with a representation of a scope and/or context that can be used to identify query sources 602. For example, the scope and/or context may be defined by and/or associated with a particular managed network in connection with which document prompt 606 is provided (e.g., by a user and/or computing system). Thus, query sources 602 may include data sources associated with the particular managed network, but may exclude data sources associated with other managed networks. As another example, the scope and/or context may be defined by and/or associated with a particular computational instance of remote network management platform 320 in connection with which document prompt 606 is provided. Thus, query sources 602 may include data sources associated with the particular computational instance of remote network management platform 320, but may exclude data sources associated with other computational instances.

Accordingly, by considering the scope and/or context associated with document prompt 606, updated document 628 may include content that is likely to be relevant to the user and/or system that provided document prompt 606. Accordingly, as the scope and/or context associated with document prompt 606 changes, document generation system 600 may be configured to generate different versions of updated document 628 based on the same document prompt 606. For example, two different users in two different managed networks, each of which provides a different scope and/or context, may obtain different versions of updated document 628 using the same document prompt 606.

Text summarization model 616 may be configured to determine topic(s) 618 based on queries 610. Topic(s) 618 may provide a summary of queries 610. Specifically, text summarization model 616 may be configured to summarize each of queries 610 using a corresponding topic of topic(s) 618. In some cases, multiple queries may be summarized using a single topic. For example, multiple queries that are similar and/or redundant may be represented using a single topic, thus reducing the amount of redundant information provided as input to generative ML model 620.

Topic(s) 618 may provide a basis for at least partly describing the subject indicated by document prompt 606. For example, topic(s) 618 may include information spanning the subject to the extent that such information is present in query sources 602 and/or response sources 604. Providing topic(s) 618, rather than queries 610, as an input to generative ML model 620 may facilitate generation of documents that are concise and/or non-redundant, since text summarization model 616 may filter out redundancies and/or repetitions from queries 610 in the process of generating topic(s) 618.

For example, a particular topic of topic(s) 618 may summarize ten different queries, each of which asks approximately the same question in a different way. Thus, explicitly providing each of these ten different queries as input to generative ML model 620 may result in document 622 including redundant content, whereas providing the particular topic as input to generative ML model 620 instead of these ten different queries is more likely to result in a concise answer to the question.

Response selector 612 may be configured to determine information source(s) 614 based on document prompt 606 and response sources 604, and possibly also based on queries 610 and/or topic(s) 618. Information source(s) 614 may include one or more information sources that are relevant and/or related to document prompt 606, queries 610, and/or topic(s) 618. For example, response selector 612 may be configured to identify information source(s) 614 in response sources 604 based on a similarity between (i) document prompt 606 (e.g., the subject specified by document prompt 606), queries 610, and/or topic(s) 618 and (ii) each of information source(s) 614. The similarity may be measured using model(s) and/or algorithm(s) that are similar to and/or the same as those discussed above with respect to query selector 608.

Response selector 612 may be configured to determine, for each respective information source of a plurality of information sources in response sources 604, a corresponding similarity value that represents a similarity between (i) the respective information source and (i) document prompt 606 (e.g., the subject specified therein), queries 610, and/or topic(s) 618. Response selector 612 may select each of information source(s) 614 based on each of information source(s) 614 having a corresponding similarity value that exceeds a threshold information similarity value (e.g., 0.5, 0.6, 0.7, 0.75, etc.). Additionally or alternatively, response selector 612 may be configured to determine information source(s) 614 by selecting up to a predetermined number of information sources with contents that are most similar to document prompt 606, queries 610, and/or topic(s) 618. Thus, information source(s) 614 may include information sources that are likely to assist with responding to document prompt 606, and may exclude information sources that are likely to be irrelevant to document prompt 606.

Response sources 604 may include any data sources that are likely to include information and/or responses associated with document prompt 606, queries 610, and/or topic(s) 618. The data sources may be similar to and/or the same as the data sources discussed above in connection with query sources 602. In some cases, response sources 604 may be indicated by and/or selected based on a scope and/or context associated with document prompt 606 (e.g., a managed network and/or a computational instance in connection with which document prompt 606 is provided), as discussed above in connection with query sources 602.

In some implementations, response selector 612 may be configured to determine whether each of queries 610 is addressable using response sources 604. For example, response selector 612 may be configured to (i) determine candidate information sources that are similar to document prompt 606, queries 610, and/or topic(s) 618 and (ii) identify, within the candidate information sources, information source(s) 614 that address queries 610. Thus, some of the candidate information sources might be excluded from information source(s) 614 due to failing to address any of queries 610.

Response selector 612 may include a query answering model configured to attempt to identify, for each respective query of queries 610, a corresponding response/answer in the candidate information sources. The query answering model may be configured to address a respective query by identifying, within the candidate information sources, a textual string that contains the corresponding response/answer. The respective query may be considered addressable when the textual string selected by the query answering model in response to the query is associated with at least a threshold confidence value, as determined by the query answering model. In some cases, each of information source(s) 614 may include the textual string of the respective query, but might not include other parts of the corresponding candidate information source. That is, each of information source(s) 614 may include the answer to a corresponding question, but may exclude surrounding text found in the corresponding candidate information source to reduce and/or minimize the amount of irrelevant information provided as input to generative ML model 620.

In some implementations, when a particular query of queries 610 is not addressable using response sources 604, generation of document 622 and/or updated document 628 may be aborted. That is, document generation system 600 might not generate a document when response sources 604 are determined to lack sufficient information to answer all of queries 610. In other implementations, when the particular query of queries 610 is not addressable using response sources 604, the particular query may be removed from queries 610, and document 622 and/or updated document 628 may be generated independently of the particular query. Document generation system 600 may also add to document 622 and/or updated document 628 an indication of the particular query to explicitly indicate information that may be missing from these documents.

Generative ML model 620 may be configured to generate document 622 based on document prompt 606, topic(s) 618, and/or information source(s) 614. FIG. 8 illustrates an example of how such data may be structured when provided as input to generative ML model 620. Specifically, document prompt 606 may instruct generative ML model 620 on the subject for document 622, topic(s) 618 may indicate different aspects of the subject that are to be described by document 622, and information source(s) 614 may provide the information to be used in describing topic(s) 618. Document 622 may represent an initial attempt by generative ML model 620 to describe the subject of document prompt 606. An initial version of document 622 may be generated by generative ML model 620 without explicitly providing thereto as input any of queries 610.

Query selector 608, response selector 612, text summarization model 616, generative ML model 620, and/or validation model 624 may include and/or be based on a large language model (LLM). For example, each respective model of query selector 608, response selector 612, text summarization model 616, generative ML model 620, and/or validation model 624 may include and/or be based on an LLM that has been trained to perform at least some of the operations of the respective model as described herein.

An LLM is an advanced computational model, primarily functioning within the domain of natural language processing (NLP) and machine learning. An LLM can be configured to understand, interpret, generate, and respond to human language in a manner that is both contextually relevant and syntactically coherent. The underlying structure of an LLM is typically based on a neural network architecture, more specifically, a variant of the transformer model. Transformers are notable for their ability to process sequential data, such as text, with high efficiency.

The operation of an LLM involves layers of interconnected processing units, known as neurons, which collectively form a deep neural network. This network can be trained on vast datasets comprising text from diverse sources, thereby enabling the LLM to learn a wide array of language patterns, structures, and colloquial nuances for prose, poetry, and program code. The training process involves adjusting the weights of the connections between neurons using algorithms such as backpropagation, in conjunction with optimization techniques like stochastic gradient descent, to minimize the difference between the LLM's output and expected output.

An aspect of an LLM's functionality is its use of attention mechanisms, particularly self-attention, within the transformer architecture. These mechanisms allow the model to weigh the importance of different parts of the input text differently, enabling it to focus on relevant aspects of the data when generating responses or analyzing language. The self-attention mechanism facilitates the model's ability to generate contextually relevant and coherent text by understanding the relationships and dependencies between words or tokens in a sentence (or longer parts of texts), regardless of their position.

Upon receiving an input, such as a text query or a prompt, the LLM may process this input through its multiple layers, generating a probabilistic model of the language therein. It predicts the likelihood of each word or token that might follow the given input, based on the patterns it has learned during its training. The model then generates an output, which could be a continuation of the input text, an answer to a query, or other relevant textual content, by selecting words or tokens that have the highest probability of being contextually appropriate.

Furthermore, an LLM can be fine-tuned after its initial training for specific applications or tasks. This fine-tuning process involves additional training (e.g., with reinforcement from humans), usually on a smaller, task-specific dataset, which allows the model to adapt its responses to suit particular use cases more accurately. This adaptability makes LLMs highly versatile and applicable in various domains, including but not limited to, chatbot development, content creation, language translation, and sentiment analysis.

Some LLMs are multimodal in that they can receive prompts in formats other than text and can produce outputs in formats other than text. Thus, while LLMs are predominantly designed for understanding and generating textual data, multimodal LLMs extend this functionality to include multiple data modalities, such as visual and auditory inputs, in addition to text.

A multimodal LLM can employ an advanced neural network architecture, often a variant of the transformer model that is specifically adapted to process and fuse data from different sources. This architecture integrates specialized mechanisms, such as convolutional neural networks for visual data and recurrent neural networks for audio processing, allowing the model to effectively process each modality before synthesizing a unified output.

The training of a multimodal LLM involves multimodal datasets, enabling the model to learn not only language patterns but also the correlations and interactions between different types of data. This cross-modal training results in multimodal LLMs being adept at tasks that require an understanding of complex relationships across multiple data forms, a capability that text-only LLMs do not possess. This makes multimodal LLMs particularly suited for advanced applications that necessitate a holistic understanding of multimodal information, such as chatbots that can interpret and produce images and/or audio.

In some cases, document 622 might not provide a complete description of the subject specified by document prompt 606. For example, document 622 might not address each of queries 610 and/or aspects of topic(s) 618, and thus might lack some information on the subject specified by document prompt 606. That is, the initial document generated by generative ML model 620 may be an incomplete draft, and thus should be revised and/or updated to more completely address document prompt 606.

To address this possibility, document generation system 600 may be configured to provide review and revision of instantiations of document 622. Specifically, document generation system 600 may include validation model 624 configured to determine whether document 622 adequately, sufficiently, and/or completely addresses document prompt 606 (e.g., adequately, sufficiently, and/or completely covers the subject specified by document prompt 606). Validation model 624 may be configured to quantify the quality of document 622 by identifying unaddressed query 626 based on document 622 and queries 610. Unaddressed query 626 may represent a subset of queries 610 that is not addressed (e.g., partially or completely) by document 622. Document 622 may be considered complete when document 622 addresses (e.g., includes an answer to) each of queries 610, and may be considered incomplete when validation model 624 identifies one or more instantiations of unaddressed query 626.

Validation model 624 may include a query answering model configured to attempt to identify, for each respective query of queries 610, a corresponding response/answer in document 622 and/or updated versions thereof. The query answering model may be configured to determine that the respective query is addressed by identifying, within document 622, a generated textual string that contains the corresponding response/answer to the respective query. The respective query may be considered addressed by document 622 when the generated textual string selected by the query answering model is associated with at least a threshold confidence value (e.g., 0.7, 0.75, 0.8, etc.), as determined by the query answering model. In some implementations, the query answering model of validation model 624 may be the same as or similar to the query answering model of response selector 612.

Additionally or alternatively, the respective query may be considered addressed by document 622 when the generated textual string is sufficiently similar (e.g., as quantified using a similarity value determined using any of the approached discussed herein) to the corresponding response/answer identified by response selector 612 for the respective query. Thus, validation model 624 may be configured to determine that, in determining the generated textual string, generative ML model 620 has not substantially modified the content of the corresponding response/answer identified by response selector 612 in response sources 604.

To correct for any deficiencies identified by validation model 624 in document 622, document generation system 600 may be configured to cause generative ML model 620 to generate an updated version of document 622 further based on unaddressed query 626. That is, based on validation model 624 determining unaddressed query 626, unaddressed query 626 may be provided to generative ML model 620 as an additional input, thus prompting generative ML model 620 to more explicitly, clearly, and/or accurately address unaddressed query 626 when generating the updated version of document 622. Thus, generative ML model 620 may be configured to generate an updated version of document 622 based on document prompt 606, topic(s) 618, information source(s) 614, and/or unaddressed query 626.

In some cases, generative ML model 620 may be configured to generate the updated version of document 622 further based on contextual data associated with generating document 622. The contextual data may include all input provided to generative ML model 620 in connection with generating document 622, state(s) of generative ML model 620 reached in connection with generating document 622, and/or document 622 itself, among other possibilities. Thus, updated version of document 622 may be based on information associated with generating prior version of document 622.

The operations of generative ML model 620 and/or validation model 624 may be repeated one or more times until validation model 624 does not identify any unaddressed queries in the updated version of document 622. That is, validation model 624 may cause generative ML model 620 to generate updated versions of document 622 until each of queries 610 is addressed by the updated version of document 622. Updated document 628 may represent a version of document 622 that addresses all of queries 610. Thus, updated document 628 may provide a sufficient, adequate, and/or complete description of the subject specified by document prompt 606, and may be the result of two or more iterations of generative ML model 620 and/or validation model 624.

In some implementations, data related to information source(s) 614 may be stored in association with updated document 628. Further, each respective information source of information source(s) 614 may be mapped to a corresponding portion of updated document 628, where the corresponding portion is based on the respective information source. Thus, document generation system 600 may be configured to create an association between the contents of updated document 628 and the underlying data used for generating these contents, thereby allowing the information in updated document 628 to be verified. For example, a particular textual string (identified in response sources 604) that addresses a given query of queries 610 may be stored in association with a generated textual string present in updated document 628. The generated textual string may also address the given query but may differ from the particular textual string. For example, the generated textual string may be a rewritten version of the particular textual string.

The accuracy of the generated textual string may be verifiable by viewing the particular textual string. For example, updated document 628 may be transmitted to a client device along with a user interface that includes user interface components configured to allow a user to request and/or view the underlying data on which different portions of updated document 628 are based. For example, each respective portion (e.g., textual string) of updated document 628 may be displayed using and/or in association with a corresponding user interface component that, if selected and/or interacted with, is configured to cause the client device to request the underlying data on which the respective portion has been generated by generative ML model 620. The user interface component may include a button, icon, dropdown, tag, and/or tooltip, among other possibilities.

Thus, by interacting with (e.g., clicking, dragging, selecting, hovering over, etc.) the user interface component associated with the generated textual string, a user may cause the client device to request the particular textual string (identified in response sources 604) that provides an answer to the same query as the generated textual string. That is, the user interface may allow the user to view the underlying data in response sources 604 used for generating each of the different portions of updated document 628. Alternatively, the underlying data may be included as part of updated document 628, and thus selection and/or interaction with the user interface component may cause the client device to display the underlying data without a separate request to document generation system 600 for the underlying data.

In some implementations, document generation system 600 may be configured to monitor query sources 602 and/or response sources 604 to determine whether any queries and/or information sources used in generating updated document 628 have been modified. When a modification to any queries and/or information sources used in generating updated document 628 is identified, document generation system 600 may be configured to regenerate updated document 628 and/or a portion thereof based on the queries and/or information sources as updated. Thus, document generation system 600 may be configured to automatically keep updated document 628 up-to-date with any relevant new information in query sources 602 and/or response sources 604.

For example, response selector 612 may be configured to determine that a particular information source has been modified. Based on this determination, response selector 612 may be configured to determine that the particular information source as modified provides a first response to a corresponding query, where the first response differs from a second response to the corresponding query provided by updated document 628 and/or a prior version of the particular information source as used for generating updated document 628. That is, response selector 612 may be configured to determine that response sources 604 include a new and/or improved answer to the corresponding query, thus indicating that updated document 628 may be improved by incorporating this new and/or improved answer. Accordingly, based on determining that the first response differs from the second response, generative ML model 620 may be configured to generate another version of updated document 628 based on the particular information source as modified, and possibly based additionally on any of the inputs discussed above.

In some implementations, portions of updated document 628 may be modified by one or more users. For example, a user may manually edit the content of updated document 628 to provide additional responses, improve existing responses, and/or adjust a writing style of updated document 628, among other potential modifications. Such user modifications of updated document 628 may be tracked by document generation system 600. When a new version of updated document 628 is generated that alters any user-modified portions of a prior version of updated document 628, these alterations may be presented to a user and/or administrator for approval before the new version of updated document 628 is published and/or released.

For example, document generation system 600 may be configured to determine a difference between the new version and the prior version of updated document 628, and may cause this difference to be displayed to the user and/or administrator using a user interface. The user and/or administrator may be prompted, using the user interface, to select the content of the new version, select the content of the prior version, and/or provide new content for the new version of updated document 628. That is, when updated document 628 includes user-specified content, document generation system 600 may ask the user and/or administrator to resolve any conflicts between the contents of different versions of updated document 628, thus increasing the likelihood of updated document 628 correctly addressing queries 610.

VII. Example Message Flow Diagram

Figure 7:
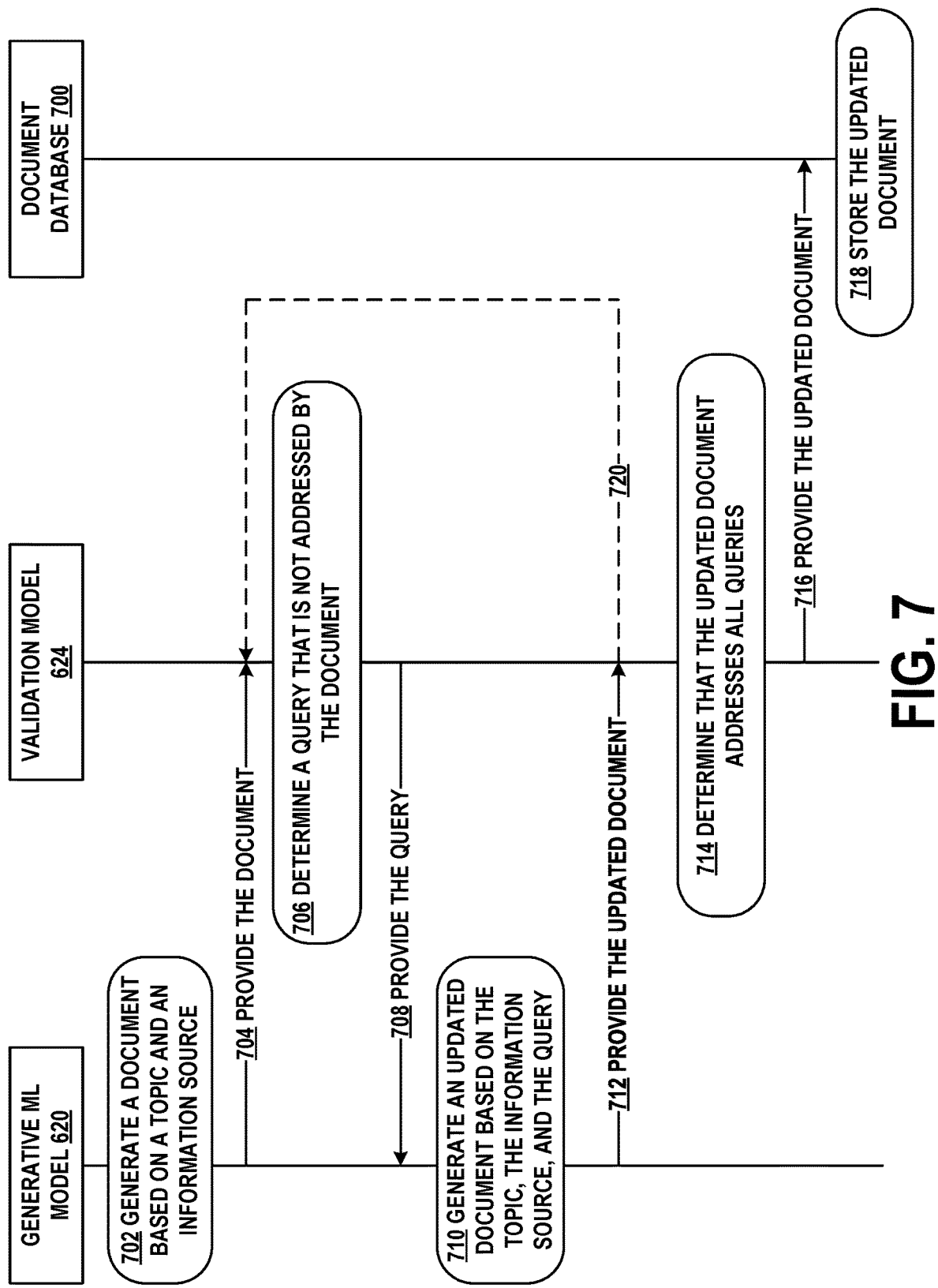
FIG. 7 is a message flow diagram, in accordance with example embodiments.

FIG. 7 illustrates an example message flow diagram that illustrates operations of generative ML model 620, validation model 624, and document database 700. Document database 700 may be configured to store documents that have been generated by generative ML model 620 and validated by validation model 624. Document database 700 may represent, for example, a knowledge database configured to store a plurality of knowledge base articles.

Generative ML model 620 may be configured to generate a document based on a topic and an information source, as indicated by block 702. Generation of the document may be prompted by a document prompt. For example, the document generated at block 702 may correspond to document 622. Based on and/or in response to generation of the document at block 702, generative ML model 620 may be configured to provide the document to validation model 624, as indicated by arrow 704. That is, prior to storage and/or publication of the document using document database 700, the document may be assessed for sufficiency, adequacy, and/or completeness using validation model 624.

Based on and/or in response to reception of the document at arrow 704, validation model 624 may be configured to determine a query that is not addressed by the document, as indicated by block 706. That is, validation model 624 may determine that the document is insufficient, inadequate, and/or incomplete at least in that it fails to address the query. Based on and/or in response to identifying the query at block 706, validation model 624 may be configured to provide the query to generative ML model 620, as indicated by arrow 708.

Based on and/or in response to reception of the query at arrow 708, generative ML model 620 may be configured to generate an updated document based on the topic, the information source, and the query, as indicated by block 710. Thus, the query may be explicitly provided to generative ML model 620 as an additional input, thus prompting generative ML model 620 to address the query in a subsequent version of the document. The query might not be provided as an input to generative ML model 620 as part of the operations at block 702. That is, generative ML model 620 may generate the document at block 702 based on the topic corresponding to the query determined at block 706, but independently of the query itself. This approach may promote conciseness and reduce the likelihood of redundant content in the document, while allowing any unaddressed questions to be addressed by revised versions of the document.

Based on and/or in response to generation of the updated document at block 710, generative ML model 620 may be configured to provide the updated document to validation model 624, as indicated by arrow 712. Since the updated document is based on the query identified at block 706, it is more likely that the updated document addresses the query, and thus provides a more complete response to the document prompt.

In some cases, based on and/or in response to reception of the updated document at arrow 712, validation model 624 may be configured to determine that an additional query is not addressed by the updated document. That is, the operations of block 706 through arrow 712 may be repeated, as indicated by arrow 720, to identify and address the additional query. Thus, generative ML model 620 may generate, and validation model 624 may evaluate, one or more updated versions of the updated article before generating a version that is adequate, sufficient, and/or complete, with each version of the document being generated further based on any questions that have not been addressed by a prior version of the document.

Based on and/or in response to reception of the updated document at arrow 712 (possibly following generation of multiple versions of the updated document), validation model 624 may be configured to determine that the updated document addresses all queries, as indicated by block 714. That is, validation model 624 may be configured to determine that the updated document is adequate, sufficient, and/or complete at least in that it addresses all queries that are semantically related to the document prompt.

Based on and/or in response to determining that the updated document addresses all queries at block 714, validation model 624 may be configured to provide the updated document to document database 700, as indicated by arrow 716. Based on and/or in response to reception of the updated document at arrow 716, document database 700 may be configured to store the updated document, as indicated by block 718. Storage of the updated document in document database 700 may allow the updated document to be accessed and/or viewed by one or more users and/or computing systems.

VIII. Example Generative ML Model Input

FIG. 8 illustrates an example structure of the input data for generative ML model 620. Specifically, generative ML model input 830 provides an example textual representation of document prompt 606, topic(s) 618, information source(s) 614, and unaddressed query 626.

Lines 800, 801, 808, and 809 of generative ML model input 830 represent aspects of document prompt 606. Specifically, the text on lines 800 and 801 may represent a default portion of document prompt 606, while the text on line 809 may be supplied by a user and/or computing system to specify subject 836 as the subject for the document. For example, subject 836 may relate to setting up one or more technical aspects of remote network management platform 320 in connection with a managed network.

Lines 803-806 of generative ML model input 830 represent information source(s) 614. Information source(s) 614 may include textual representations of information source 832 through information source 834 ("information sources 832-834"). For example, each respective information source of information sources 832-834 may include a corresponding textual string extracted from response sources 604 to answer a corresponding query of queries 610.

Lines 811-814 of generative ML model input 830 represent topic(s) 618. Topic(s) 618 may include textual representations of topic 838 through topic 840 ("topics 838-840"). For example, each respective topic of topics 838-840 may include a corresponding textual string generated by text summarization model 616 based on corresponding one or more of queries 610.

Lines 816-819 of generative ML model input 830 represent unaddressed query 626 and/or any queries included as part of document prompt 606. These queries may include textual representations of query 842 through query 844 ("queries 842-844"). For example, each respective query of queries 842-844 may include a corresponding textual string representing unaddressed query 626 and/or any queries included as part of document prompt 606.

In some cases, generative ML model input 830 used in connection with a first iteration of generative ML model 620 might not include any queries (i.e., lines 816-819 might be empty). As validation model 624 identifies unanswered queries, queries may be added to generative ML model input 830. For example, over the course of multiple iterations of generative ML model 620, the "queries" portion of generative ML model input 830 may get successively longer as additional unanswered queries are accumulated. That is, for a given iteration of generative ML model 620, generative ML model input 830 may include all queries that have not been addressed by all prior versions of a given document, thus prompting generative ML model to address all previously-identified deficiencies in the document.

IX. Example Technical Improvements

These embodiments provide a technical solution to a technical problem. One technical problem being solved is how to programmatically facilitate the generation and review of documents by generative ML models. In practice, this is problematic because it may be difficult to objectively asses when a document completely covers and/or describes a particular subject.

In the prior art, the adequacy, sufficiency, and/or completeness of a document was typically unknown. Document evaluations relied on subjective decision making, which led to wildly varying outcomes from instance to instance. Thus, prior art techniques did little if anything to address the variability in the quality of documents, much less being able to quickly and accurately generate and review large numbers of documents.

The embodiments herein overcome these limitations by combining a generative ML model with a validation model configured to determine whether documents generated by the generative ML model answer each of a plurality of questions associated with a subject of the document. In this manner, accurate review and evaluation of documents generated by generative ML models can be accomplished in a more accurate and robust fashion. This results in several advantages. First, documents generated in this manner may address each of a plurality of questions associated with a given subject, and may thus be more likely to provide complete and/or accurate coverage of the subject for the document. Second, the documents may be generated and revised quickly and in a scalable fashion. Third, the generation and review may be based on a large number of different sources of information, thereby increasing the likelihood of produced documents being comprehensive and useful.

Other technical improvements may also flow from these embodiments, and other technical problems may be solved. Thus, this statement of technical improvements is not limiting and instead constitutes examples of advantages that can be realized from the embodiments.

X. Example Operations

Figure 9:
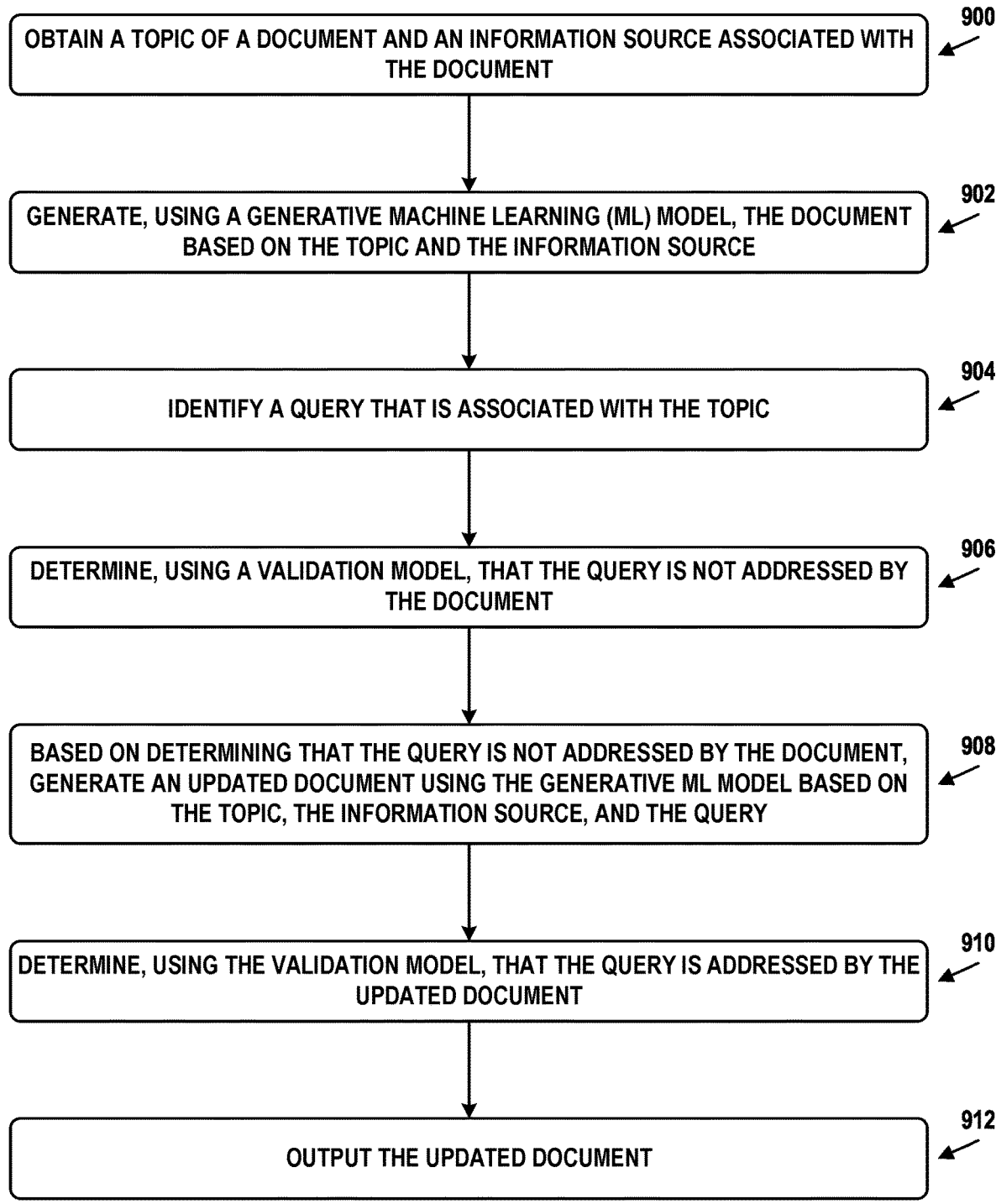
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining a topic of a document and an information source associated with the document.

Block 902 may involve generating, using a generative ML model, the document based on the topic and the information source.

Block 904 may involve identifying a query that is associated with the topic.

Block 906 may involve determining, using a validation model, that the query is not addressed by the document.

Block 908 may involve, based on determining that the query is not addressed by the document, generating an updated document using the generative ML model based on the topic, the information source, and the query.

Block 910 may involve determining, using the validation model, that the query is addressed by the updated document.

Block 912 may involve outputting the updated document.

In some examples, the document may include a knowledge base article.

In some examples, an instruction to generate the document may be obtained. The instruction may indicates a subject for the document. The subject may span a plurality of topics that includes the topic. The generative ML, model may be configured to generate the document and the updated document further based on the instruction.

In some examples, the document may be associated with a subject that spans a plurality of topics including the topic. Identifying the query may include identifying one or more queries associated with the subject based on a similarity between the subject and the one or more queries. The one or more queries may include the query. The topic may be determined by processing the one or more queries using a text summarization model.

In some examples, the one or more queries may include a plurality of queries. The text summarization model may be configured to summarize two or more queries of the plurality of queries by determining the topic to collectively represent the two or more queries.

In some examples, identifying the one or more queries may include determining, for each respective query of a plurality of queries associated with the subject, a corresponding similarity value representing a similarity between the subject and the respective query. The one or more queries may be selected from the plurality of queries based on each of the one or more queries having a corresponding similarity value that exceeds a threshold query similarity value.

In some examples, the document may be associated with a subject that spans a plurality of topics including the topic. Obtaining the information source may include identifying one or more information sources associated with the subject based on a similarity between the subject and the one or more information sources. The one or more information sources may include the information source. Obtaining the information source may also include determining, using a query answering model, that the query is addressable using the one or more information sources. The document may be generated based on determining that the query is addressable using the one or more information sources.

In some examples, identifying the one or more information sources may include determining, for each respective information source of a plurality of information sources associated with the subject, a corresponding similarity value representing a similarity between the subject and the respective information source. The one or more information sources may be selected from the plurality of information sources based on each of the one or more information sources having a corresponding similarity value that exceeds a threshold information similarity value.

In some examples, determining that the query is addressable using the one or more information sources may include identifying within the one or more information sources a textual string that answers the query. The information source may include the textual string exclusive of other parts of the one or more information sources.

In some examples, a textual string selected from the information source to answer the query may be stored. The query may be addressed by the updated document using a generated textual string that differs from the textual string. Instructions configured to cause display of the updated document using a user interface may be transmitted to a client device. The user interface may include a user interface component associated with the generated textual string and configured to receive a request for the textual string selected from the information source to answer the query. The request for the textual string may be received, from the client device, based on an interaction with the user interface component. Based on receiving the request for the textual string, additional instructions may be transmitted to the client device. The additional instructions may be configured to cause display of the textual string using the user interface.

In some examples, a user-specified query to be answered by the document may be received. The generative ML model may be configured to generate the document and the updated document further based on the user-specified query.

In some examples, the generative ML model may be configured to generate the updated document further based on contextual data associated with generating the document.

In some examples, a second query that is associated with the topic may be identified. It may be determined, using the validation model, that the second query is not addressed by the updated document. Based on determining that the second query is not addressed by the document, a second updated document may be generated using the generative ML model based on the topic, the information source, the query, and the second query. Using the validation model, it may be determined that each of the query and the second query is addressed by the second updated document. The second updated document may be output.

In some examples, generating the document may include generating the document using the generative ML model based on a plurality of topics for the document and a plurality of information sources associated with the document. Identifying the query may include identifying a plurality of queries. Determining that the query is not addressed by the document may include determining, using the validation model, that a plurality of queries are not addressed by the document. Generating the updated document may include, based on determining that the plurality of queries are not addressed by the document, generating the updated document using the generative ML model based on the plurality of topics, the plurality of information sources, and the plurality of queries. Determining that the query is addressed by the updated document may include determining, using the validation model, that each of the plurality of queries is addressed by the updated document.

In some examples, the generative ML model may include a large language model that has been trained to generate documents using a target writing style represented by a plurality of sample documents.

In some examples, the updated document may be generated for a managed network. Each of the query and the information source may be determined based on one or more of: (i) an email associated with the managed network, (ii) a meeting associated with the managed network, (iii) documentation of a product associated with the managed network, (iv) documentation of a process associated with the managed network, (v) contents of a task performed in association with the managed network, (vi) a forum associated with the managed network, (vii) a blog posts associated with the managed network, (viii) a chat group associated with the managed network, or (ix) a phone call associated with the managed network.

In some examples, it may be determined that the information source has been modified. Based on determining that the information source has been modified, it may be determined, using a query answering model, that a first response to the query provided by the updated document is different from a second response to the query provided by the information source as modified. Based on determining that the first response is different from the second response, a second updated document may be generated using the generative ML model based on the topic and the information source as modified. The second updated document may be output.

In some examples, a modification to the updated document may be received by way of a user interface. A second updated document may be generated using the generative ML model. It may be determined that a first portion of the updated document differs from a second portion of the second updated document. The first portion may correspond to the modification received by way of the user interface. The second portion may correspond to the first portion at least in that the second portion addresses a same query as the first portion. Based on determining that the first portion differs from the second portion, display may be caused of a representation of a difference between the first portion and the second portion by way of the user interface. A specification of content for the second portion may be received by way of the user interface based on causing display of the representation of the difference.

XI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:
1. A method comprising:
obtaining a topic of a document and an information source associated with the document;

generating, using a generative machine learning (ML) model, the document based on the topic and the information source;

identifying a query that is associated with the topic;

determining, using a validation model, that the query is not addressed by the document;

based on determining that the query is not addressed by the document, generating an updated document using the generative ML model based on the topic, the information source, and the query;

determining, using the validation model, that the query is addressed by the updated document; and outputting the updated document.

2. The method of claim 1, wherein the document comprises a knowledge base article.

3. The method of claim 1, further comprising:

obtaining an instruction to generate the document, wherein the instruction indicates a subject for the document, wherein the subject spans a plurality of topics comprising the topic, and wherein the generative ML model is configured to generate the document and the updated document further based on the instruction.

4. The method of claim 1, wherein the document is associated with a subject that spans a plurality of topics comprising the topic, and wherein identifying the query comprises:

identifying one or more queries associated with the subject based on a similarity between the subject and the one or more queries, wherein the one or more queries comprise the query; and determining the topic by processing the one or more queries using a text summarization model.

5. The method of claim 4, wherein the one or more queries comprise a plurality of queries, and wherein the text summarization model is configured to summarize two or more queries of the plurality of queries by determining the topic to collectively represent the two or more queries.

6. The method of claim 4, wherein identifying the one or more queries comprises:

determining, for each respective query of a plurality of queries associated with the subject, a corresponding similarity value representing a similarity between the subject and the respective query; and selecting, from the plurality of queries, the one or more queries based on each of the one or more queries having a corresponding similarity value that exceeds a threshold query similarity value.

7. The method of claim 1, wherein the document is associated with a subject that spans a plurality of topics comprising the topic, and wherein obtaining the information source comprises:

identifying one or more information sources associated with the subject based on a similarity between the subject and the one or more information sources, wherein the one or more information sources comprise the information source; and determining, using a query answering model, that the query is addressable using the one or more information sources, wherein the document is generated based on determining that the query is addressable using the one or more information sources.

8. The method of claim 7, wherein identifying the one or more information sources comprises:

determining, for each respective information source of a plurality of information sources associated with the subject, a corresponding similarity value representing a similarity between the subject and the respective information source; and selecting, from the plurality of information sources, the one or more information sources based on each of the one or more information sources having a corresponding similarity value that exceeds a threshold information similarity value.

9. The method of claim 7, wherein determining that the query is addressable using the one or more information sources comprises:

identifying within the one or more information sources a textual string that answers the query, wherein the information source comprises the textual string exclusive of other parts of the one or more information sources.

10. The method of claim 1, further comprising:

storing a textual string selected from the information source to answer the query, wherein the query is addressed by the updated document using a generated textual string that differs from the textual string;

transmitting, to a client device, instructions configured to cause display of the updated document using a user interface comprising a user interface component associated with the generated textual string and configured to receive a request for the textual string selected from the information source to answer the query;

receiving, from the client device, the request for the textual string based on an interaction with the user interface component; and based on receiving the request for the textual string, transmitting, to the client device, additional instructions configured to cause display of the textual string using the user interface.

11. The method of claim 1, further comprising:

receiving a user-specified query to be answered by the document, wherein the generative ML model is configured to generate the document and the updated document further based on the user-specified query.

12. The method of claim 1, wherein the generative ML model is configured to generate the updated document further based on contextual data associated with generating the document.

13. The method of claim 1, further comprising:

identifying a second query that is associated with the topic;

determining, using the validation model, that the second query is not addressed by the updated document;

based on determining that the second query is not addressed by the document, generating a second updated document using the generative ML model based on the topic, the information source, the query, and the second query;

determining, using the validation model, that each of the query and the second query is addressed by the second updated document; and outputting the second updated document.

14. The method of claim 1, wherein:

generating the document comprises generating the document using the generative ML model based on a plurality of topics for the document and a plurality of information sources associated with the document, identifying the query comprises identifying a plurality of queries, determining that the query is not addressed by the document comprises determining, using the validation model, that a plurality of queries are not addressed by the document, generating the updated document comprises, based on determining that the plurality of queries are not addressed by the document, generating the updated document using the generative ML model based on the plurality of topics, the plurality of information sources, and the plurality of queries, and determining that the query is addressed by the updated document comprises determining, using the validation model, that each of the plurality of queries is addressed by the updated document.

15. The method of claim 1, wherein the generative ML model comprises a large language model that has been trained to generate documents using a target writing style represented by a plurality of sample documents.

16. The method of claim 1, wherein the updated document is generated for a managed network, and wherein each of the query and the information source is determined based on one or more of: (i) an email associated with the managed network, (ii) a meeting associated with the managed network, (iii) documentation of a product associated with the managed network, (iv) documentation of a process associated with the managed network, (v) contents of a task performed in association with the managed network, (vi) a forum associated with the managed network, (vii) a blog posts associated with the managed network, (viii) a chat group associated with the managed network, or (ix) a phone call associated with the managed network.

17. The method of claim 1, further comprising:
determining that the information source has been modified;
based on determining that the information source has been modified, determining, using a query answering model, that a first response to the query provided by the updated document is different from a second response to the query provided by the information source as modified;
based on determining that the first response is different from the second response, generating a second updated document using the generative ML model based on the topic and the information source as modified; and
outputting the second updated document.

18. The method of claim 1, further comprising:
receiving, by way of a user interface, a modification to the updated document;
generating a second updated document using the generative ML model;
determining that a first portion of the updated document differs from a second portion of the second updated document, wherein the first portion corresponds to the modification received by way of the user interface, and wherein the second portion corresponds to the first portion at least in that the second portion addresses a same query as the first portion;
based on determining that the first portion differs from the second portion, causing display of a representation of a difference between the first portion and the second portion by way of the user interface; and
receiving, by way of the user interface, a specification of content for the second portion based on causing display of the representation of the difference.

19. A non-transitory computer-readable medium, having stored thereon program instructions that, upon execution by a computing system, cause the computing system to perform operations comprising:
obtaining a topic of a document and an information source associated with the document;
generating, using a generative machine learning (ML) model, the document based on the topic and the information source;
identifying a query that is associated with the topic;
determining, using a validation model, that the query is not addressed by the document;
based on determining that the query is not addressed by the document, generating an updated document using the generative ML model based on the topic, the information source, and the query;
determining, using the validation model, that the query is addressed by the updated document; and
outputting the updated document.

20. A system comprising:
one or more processors; and
memory, containing program instructions that, upon execution by the one or more processors, cause the system to perform operations comprising:
obtaining a topic of a document and an information source associated with the document;
generating, using a generative machine learning (ML) model, the document based on the topic and the information source;
identifying a query that is associated with the topic;
determining, using a validation model, that the query is not addressed by the document;
based on determining that the query is not addressed by the document, generating an updated document using the generative ML model based on the topic, the information source, and the query;
determining, using the validation model, that the query is addressed by the updated document; and
outputting the updated document.

* * * * *